(12) United States Patent
Yokoyama

(10) Patent No.: US 12,292,734 B2
(45) Date of Patent: May 6, 2025

(54) WIRELESS COMMUNICATION TERMINAL DEVICE

(71) Applicant: Yanmar Power Technology Co., Ltd., Osaka (JP)

(72) Inventor: Kazuhisa Yokoyama, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 0 days.

(21) Appl. No.: 17/740,336

(22) Filed: May 9, 2022

(65) Prior Publication Data

US 2022/0269263 A1 Aug. 25, 2022

Related U.S. Application Data

(63) Continuation of application No. 16/475,354, filed as application No. PCT/JP2017/042861 on Nov. 29, 2017, now Pat. No. 11,353,864.

(30) Foreign Application Priority Data

Jan. 18, 2017 (JP) ................. 2017-006705

(51) Int. Cl.
| | |
|---|---|
| *G05D 1/00* | (2024.01) |
| *B60W 50/14* | (2020.01) |
| *B60W 60/00* | (2020.01) |
| *H04Q 9/00* | (2006.01) |
| *A01B 79/00* | (2006.01) |

(52) U.S. Cl.
CPC ............ *G05D 1/0016* (2013.01); *B60W 50/14* (2013.01); *B60W 60/0015* (2020.02); *G05D 1/0022* (2013.01); *H04Q 9/00* (2013.01); *A01B 79/005* (2013.01); *B60W 2050/146* (2013.01); *H04Q 2209/40* (2013.01)

(58) Field of Classification Search
CPC .................................................. G05D 1/0016
See application file for complete search history.

(56) References Cited

U.S. PATENT DOCUMENTS

| | | | | |
|---|---|---|---|---|
| 9,622,399 | B2* | 4/2017 | Kremmer | ............... A01B 59/06 |
| 9,802,638 | B1* | 10/2017 | Stoffel | ................ G05D 1/0088 |
| 10,126,754 | B2* | 11/2018 | Ogura | ................. G05D 1/6484 |
| 10,466,061 | B2* | 11/2019 | Newman | .............. G01C 21/362 |
| 11,353,864 | B2* | 6/2022 | Yokoyama | ........... A01B 69/008 |
| 11,442,468 | B2* | 9/2022 | Ogura | ................. G05D 1/6445 |

* cited by examiner

*Primary Examiner* — Michael A Berns
(74) *Attorney, Agent, or Firm* — Chris Mizumoto

(57) ABSTRACT

A wireless communication terminal device for operating a work vehicle that autonomously travels includes: a device main body 70 having a display 74 that is capable of accepting a touch panel operation; and an emergency-stop remote controller 71 having an emergency stop button 72 that is used to stop autonomous travel of the work vehicle. The device main body 70 and the emergency-stop remote controller 71 perform wireless communication with the work vehicle via different wireless communication networks having different communication schemes, respectively.

7 Claims, 15 Drawing Sheets

WIRELESS COMMUNICATION TERMINAL DEVICE

CROSS-REFERENCE

This application is a continuation of U.S. application Ser. No. 16/475,354, filed on Jul. 1, 2019, which is a national phase of an international application, PCT/JP2017/042861 filed on Nov. 29, 2017, which claims the benefit of Japanese Application No. 2017-006705 filed on Jan. 18, 2017, all of the disclosures of which are incorporated by reference in their entirety.

TECHNICAL FIELD

The present invention relates to a wireless communication terminal device that is operated to cause a work vehicle to autonomously travel.

BACKGROUND ART

In recent years, for enabling farm work on a field to be performed efficiently and conveniently, an autonomous travel system has been developed that causes an unmanned work vehicle having no operator riding thereon to autonomously travel (see Patent Literature 1; hereinafter PTL 1). An autonomous travel system according to PTL 1 is remotely operated by a server device installed in, for example, a house distant from the work vehicle. With this configuration, a working state of a tractor cannot be visually observed, and therefore responding to an emergency situation is difficult. Thus, to allow an autonomous travel of a work vehicle to be operated in a work place such as a field, an autonomous travel system has been developed that uses an operation terminal implemented by a wireless communication terminal device (see Patent Literature 2; hereinafter PTL 2).

CITATION LIST

Patent Literature

PTL 1: Japanese Patent Application Laid-Open No. 2011-254704
PTL 2: Japanese Patent Application Laid-Open No. 2016-095658

SUMMARY OF INVENTION

Technical Problem

An autonomous travel system including an operation terminal that employs a touch panel operation, such as a tablet-type personal computer, involves a risk that its operation responding to an emergency situation may be delayed because an operation button on the touch panel needs to be visually looked for.

Solution to Problem

The present invention has been accomplished in view of the circumstances described above, and its technical object is to provide a wireless communication terminal device that enables an operator to operate an autonomously traveling work vehicle without delay, in case of emergency.

An aspect of the present invention provides a wireless communication terminal device for operating a work vehicle that autonomously travels, the wireless communication terminal device including a device main body and an emergency-stop remote controller, the device main body including a display capable of accepting a touch panel operation, the emergency-stop remote controller including an emergency stop button used to stop autonomous travel of the work vehicle, wherein the device main body and the emergency-stop remote controller perform wireless communication with the work vehicle via different wireless communication networks having different communication schemes, respectively.

The wireless communication terminal device may be configured such that the emergency-stop remote controller is attachable to and detachable from an outer peripheral portion of the device main body.

The wireless communication terminal device may be configured such that: the emergency-stop remote controller includes a start button used to start autonomous travel of the work vehicle; and on the display of the device main body, an emergency stop button image used to stop autonomous travel of the work vehicle is displayed near a position where the emergency-stop remote controller is attached, and a start button image used to start autonomous travel of the work vehicle is displayed at a position more distant from the position where the emergency-stop remote controller is attached than the emergency stop button image is.

The wireless communication terminal device may include a casing having a main body casing part and a remote controller casing part attached to the main body casing part, the main body casing part holding an outer edge portion of the device main body over an entire periphery thereof, the remote controller casing part holding the emergency-stop remote controller in a detachable manner.

The wireless communication terminal device may be configured such that the emergency-stop remote controller includes a notification unit that provides notification about a state of the work vehicle.

Advantageous Effects of Invention

An aspect of the present invention provides a wireless communication terminal device for operating a work vehicle that autonomously travels, the wireless communication terminal device including a device main body and an emergency-stop remote controller, the device main body including a display capable of accepting a touch panel operation, the emergency-stop remote controller including an emergency stop button used to stop autonomous travel of the work vehicle. Thus, use of the emergency-stop remote controller enables an operator the to quickly recognize the emergency stop button and securely operate the emergency stop button, so that an emergency stop operation can be performed without delay in case of emergency. Moreover, in an aspect of the present invention, the device main body and the emergency-stop remote controller perform wireless communication with the work vehicle via different wireless communication networks having different communication schemes, respectively. Thus, the plurality of wireless communication networks function as a fail-safe system, which can provide an increased safety. In addition, communication schemes suitable for the device main body and for the emergency-stop remote controller can be selected in accordance with their respective communication data capacities.

DESCRIPTION OF EMBODIMENT

In the following, some embodiments of the present invention will be described based on the drawings. First, a description will be given to a robot tractor 1 (hereinafter, occasionally referred to simply as a "tractor") which is one example of a work vehicle according to the present invention. The tractor 1 includes a machine body 2 that autonomously travels on a field. The machine body 2 is provided detachably with work equipment 3 which is illustrated with the chain lines in FIG. 1 and FIG. 2. The work equipment 3 is used for farm work. Examples of the work equipment 3 include various types of work equipment such as tillers, plows, fertilizers, mowers, and seeders, among which a desired one can be selected as the work equipment 3 and attached to the machine body 2 as needed. The machine body 2 is configured to be capable of changing the height and posture of the work equipment 3 attached thereto.

Figure 3:
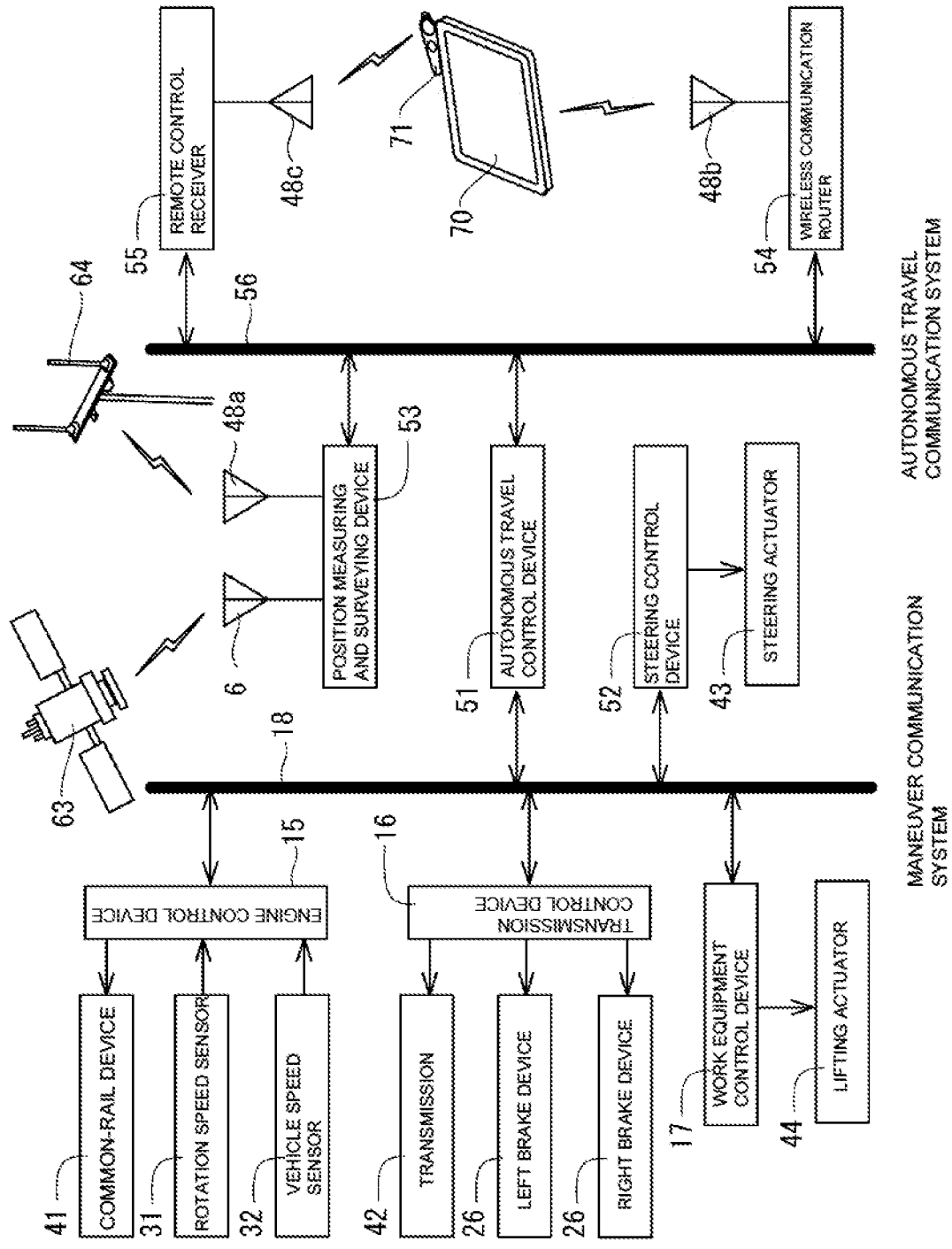
FIG. 3 A function block diagram of the robot tractor.

The phrase "autonomous travel" as used herein means that an autonomous travel control device 51 or the like, which is provided in the tractor 1 as shown in FIG. 3, controls a travel-related configuration of the tractor 1, so that the tractor 1 travels along a predetermined route. The phrase "autonomous work" as used herein means that the autonomous travel control device 51 or the like controls a work-related configuration of the tractor 1, so that the tractor 1 performs work along a predetermined route.

In the following description, a tractor that is to perform the autonomous travel and the autonomous work may be referred to as an "unmanned tractor" or a "robot tractor", whereas a tractor that is to perform travel and work while being manipulated directly by an operator may be referred to as a "manned tractor". When a part of farm work on a field is performed by the unmanned tractor, the rest of the farm work is performed by the manned tractor. Sharing farm work on a single field between the unmanned tractor and the manned tractor will be referred to as cooperative farm work, following farm work, accompanying farm work, etc. The cooperative work mentioned above may include performing farm work in one field by the unmanned tractor simultaneously with performing farm work in another field by the manned tractor.

In this embodiment, the unmanned tractor and the manned tractor are different from each other in the presence or absence of an operator's direct manipulation, and their structures as tractors are in common with each other. Thus, it is possible that the operator rides on (gets on) and directly manipulates the unmanned tractor (in other words, the operator can use the unmanned tractor as a manned tractor). It is also possible that the operator gets off the manned tractor and causes the manned tractor to perform the autonomous travel and the autonomous work (in other words, the operator can use the manned tractor as an unmanned tractor).

Figure 1:
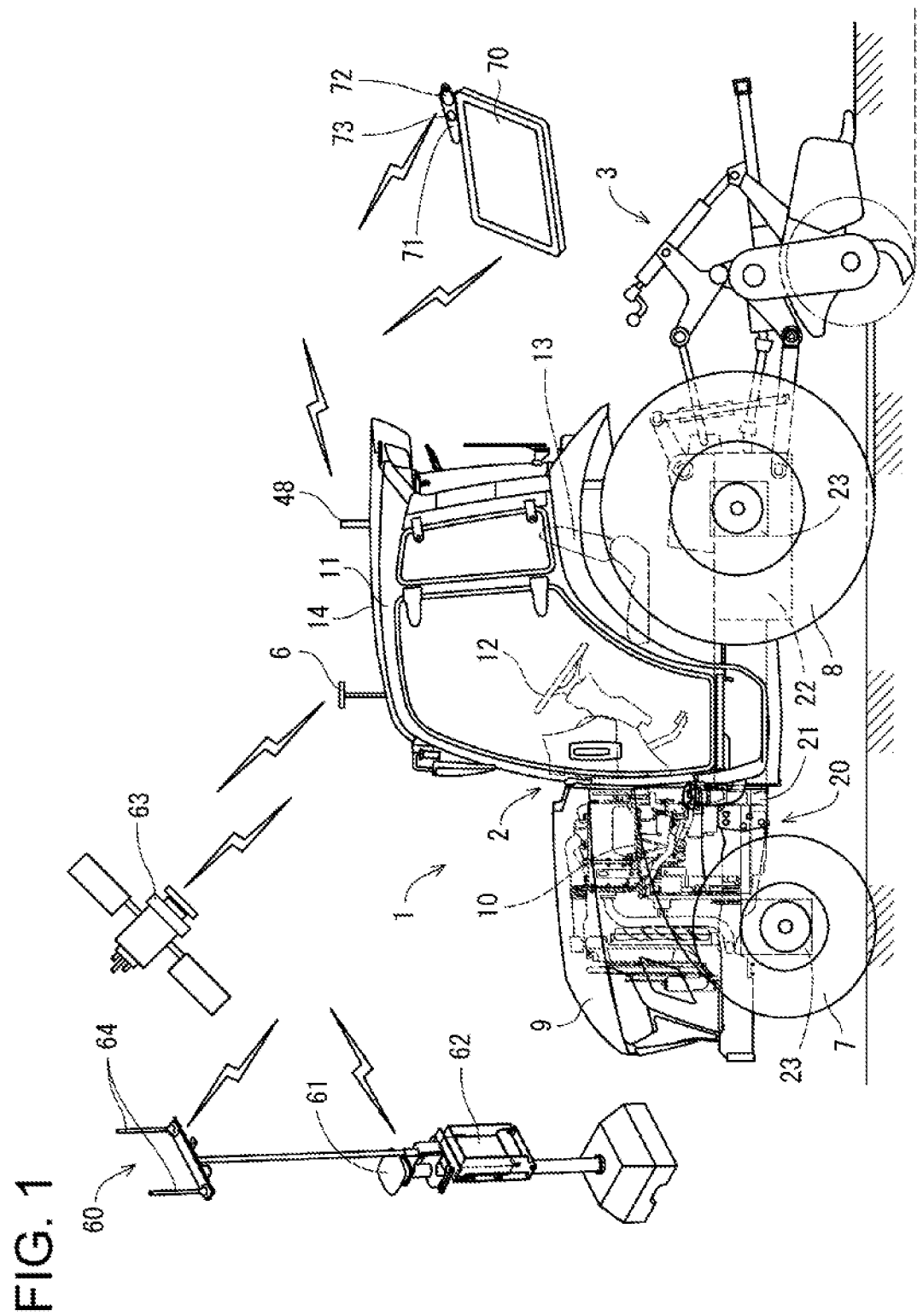
FIG. 1 A side view of an entire robot tractor according to an embodiment.
Figure 2:
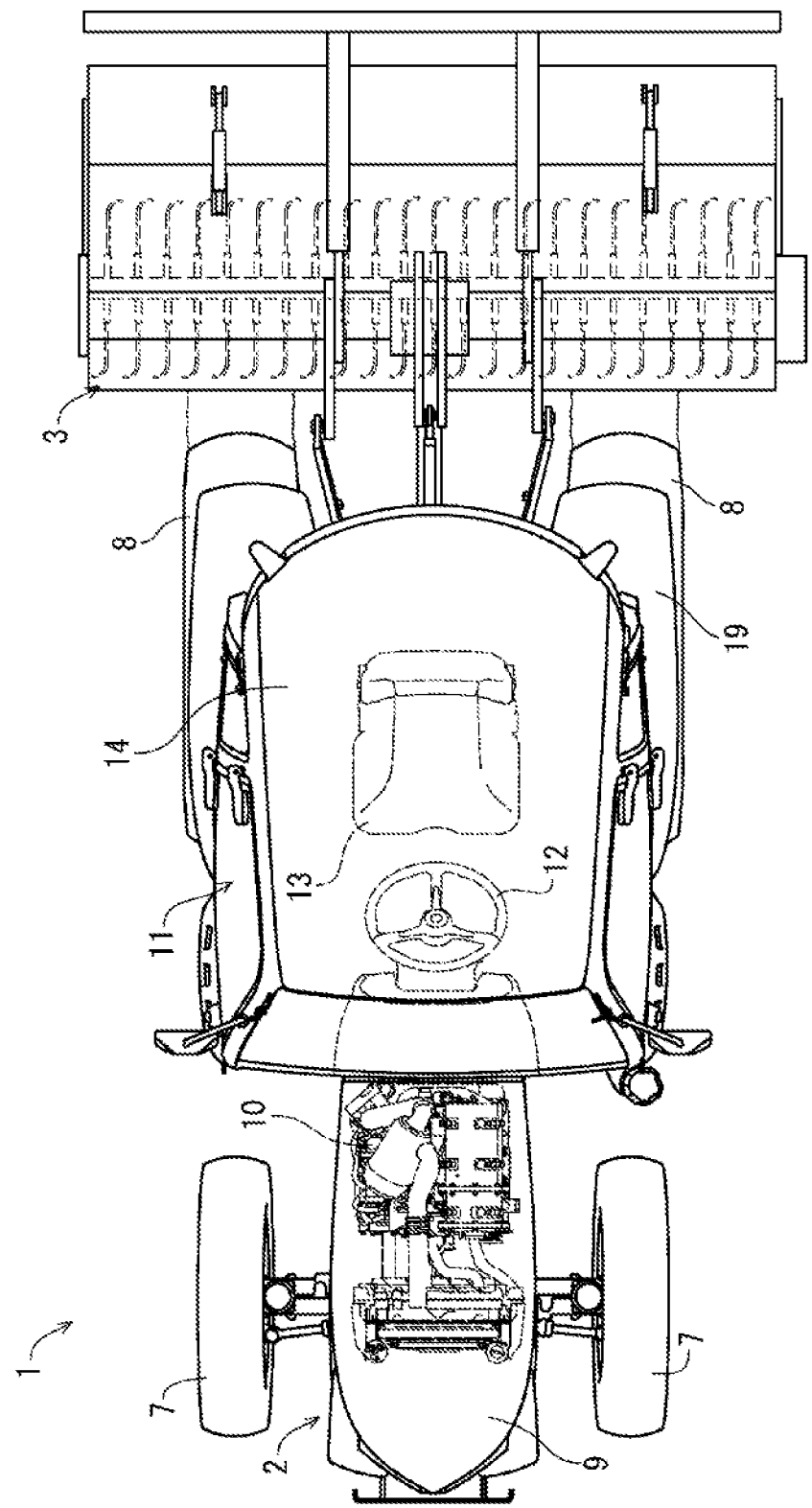
FIG. 2 A plan view of the robot tractor.

A configuration of the tractor 1 will be described with reference to FIG. 1 and FIG. 2. The machine body 2 which is a machine body of the tractor 1 has a front part supported by a pair of left and right front wheels 7 and a rear part supported by a pair of left and right rear wheels 8, as shown in FIG. 1. The front wheels 7 and the rear wheels 8 constitute a traveling unit.

The machine body 2 has a hood 9 disposed in the front part thereof. Stored in the hood 9 are an engine 10 which is a driving source of the tractor 1, a fuel tank (not shown), and the like. The engine 10 may be a diesel engine, for example. This however is not limitative. For instance, the engine 10 may be a gasoline engine. In addition to or instead of the engine, an electric motor may be employed as the driving source.

A cabin 11 where the operator rides is disposed at the rear of the hood 9. The cabin 11 mainly includes, in its inside, a steering wheel 12 to be steered by the operator, a seat 13 where the operator is able to sit, and various operating devices for performing various types of operation. Here, an agricultural work vehicle is not limited to one with the cabin 11, and may alternatively be one without any cabin 11.

Examples of the operating devices mentioned above include a monitor device, a throttle lever, a main shift lever, a lift lever, a power take-off (PTO) switch, a PTO shift lever, a plurality of hydraulic shift levers, and the like, though not shown. These operating devices are disposed adjacent to the seat 13 or to the steering wheel 12.

The monitor device is capable of displaying various kinds of information about the tractor 1. The throttle lever is used to set a rotation speed of the engine 10. The main shift lever is used to change a gear ratio of a transmission case 22. The lift lever is used to raise and lower the height of the work equipment 3 attached to the machine body 2 within a predetermined range. The PTO switch is used to connect and disconnect power transmission to a PTO shaft (power extraction shaft) which protrudes from the rear end side of the transmission case 22. When the PTO switch is ON, power is transmitted to the PTO shaft, and thus the PTO shaft is rotated so that the work equipment 3 is driven. When the PTO switch is OFF, power transmission to the PTO shaft is blocked, and thus the PTO shaft is not rotated so that the work equipment 3 stops. The PTO shift lever is used to change power to be inputted to the work equipment 3. Specifically, the PTO shift lever is used to shift a rotation speed of the PTO shaft. The hydraulic shift lever is used to switch an external hydraulic takeoff valve.

As shown in FIG. 1, a chassis 20 is provided at a lower part of the machine body 2. The chassis 20 constitutes a framework of the machine body 2. The chassis 20 includes a machine body frame 21, the transmission case 22, a front axle 23, a rear axle 24, and the like.

The machine body frame 21, which is a support member at the front part of the tractor 1, supports the engine 10 directly or via a vibro-isolating member, for example. The transmission case 22 is configured to change power received from the engine 10 and transmit the power to the front axle 23 and to the rear axle 24. The front axle 23 is configured to transmit, to the front wheels 7, the power received from the transmission case 22. The rear axle 24 is configured to transmit, to the rear wheels 8, the power received from the transmission case 22.

As shown in FIG. 3, the tractor 1 includes an engine control device 15, a transmission control device 16, and a work equipment control device 17 which are mutually communicable through a vehicle bus line 18. These control devices serve as a control unit for controlling movement of the machine body 2 (forward travel, reverse travel, stop, turn, etc.) and movement of the work equipment 3 (lift-up, lift-down, drive, stop, etc.). The engine control device 15 is electrically connected to a common-rail device 41 which serves as a fuel injection device provided in the engine 10. The transmission control device 16 is electrically connected to a transmission 42 which includes a hydraulic type transmission device that changes the speed of power received from the engine 10. The work equipment control device 17 is electrically connected to a work equipment lifting actuator 44.

The common-rail device 41 is configured to inject a fuel to each cylinder of the engine 10. The control device 4 opens or closes fuel injection valves of injectors corresponding to the respective cylinders of the engine 10, so that a high-pressure fuel that has been fed under pressure from the fuel tank to the common-rail device 41 by means of a fuel supply pump is injected from the injectors to the corresponding cylinders of the engine 10. Thereby, the fuel is supplied from each injector while an injection pressure, an injection timing, and an injection duration (injection amount) are controlled with a high accuracy.

A specific example of the transmission 42 is a hydraulic stepless transmission device of variable displacement swash plate type. The transmission 42 is provided in the transmission case 22. The control device 4 controls the transmission 42 so as to appropriately adjust the angle of a swash plate, and thereby the gear ratio of the transmission case 22 can be set to a desired gear ratio.

The lifting actuator 44 is configured to lift up or down the work equipment 3 to either a retracting position (where no farm work is performed) or a work position (where farm work is performed) by, for example, moving a three-point link mechanism that couples the work equipment 3 to the machine body 2. The control device 4 controls the lifting actuator 44 so as to appropriately lift up or down the work equipment 3, thereby enabling farm work to be performed with the work equipment 3 at a desired height in a field region, for example.

Sensors are also electrically connected to the engine control device 15. The sensors include a rotation speed sensor 31 that detects a rotation speed of the engine 10, a vehicle speed sensor 32 that detects a rotation speed of the rear wheels 8, a steering angle sensor 33 that detects a turning angle (steering angle) of the wheel 12, and the like. Detection values obtained by these sensors are converted into detection signals which are then sent to the engine control device 15.

The tractor 1 including the control devices 15 to 17 described above is configured such that, based on various operations performed by the operator riding in the cabin 11, the control devices 15 to 17 communicate with one another through the vehicle bus line 18 to control respective parts (the machine body 2, the work equipment 3, etc.) of the tractor 1, thereby allowing the tractor 1 to perform farm work while traveling in a field. In addition, the tractor 1 according to the embodiment is capable of autonomously traveling based on a predetermined control signal outputted from a remote operation device 46 even though no operator rides thereon, for example.

To be specific, as shown in FIG. 3, the tractor 1 is additionally provided with various elements, e.g., the autonomous travel control device 51, for enabling the autonomous travel. The tractor 1 is further provided with various elements, e.g., a position measuring antenna 6, necessary for acquiring position information on itself (the machine body thereof) based on a position measuring system. Such a configuration enables the tractor 1 to acquire position information on itself based on the position measuring system to perform autonomous travel on the field.

Configurations included in the tractor 1 for enabling the autonomous travel will now be described in detail. Specifically, as shown in FIG. 1 and FIG. 3, the tractor 1 includes the autonomous travel control device 51, a steering control device 52, a position measuring and surveying device 53, a wireless communication router (low-power data communication device) 54, a remote control receiver (specified low-power wireless device) 55, a steering actuator 43, the position measuring antenna 6, a wireless communication antenna unit 48, and the like.

The autonomous travel control device 51 and the steering control device 52 are capable of mutual communication with each of the engine control device 15, the transmission control device 16, and the work equipment control device 17 through the vehicle bus line 18. The autonomous travel control device 51 is also capable of mutual communication with each of the position measuring and surveying device 53, the wireless communication router 54, and the remote control receiver 55 through an autonomous travel bus line 56 belonging to an autonomous travel communication system which is a system different from a maneuver communication system where the vehicle bus line 18 belongs.

The steering actuator 43 is, for example, disposed midway in a rotation shaft (steering shaft) of the steering wheel 12. The steering actuator 43 adjusts the turning angle (steering angle) of the steering wheel 12. In order that the tractor 1 (as an unmanned tractor) can travel on a predetermined route, the steering control device 52 calculates an appropriate turning angle of the steering wheel 12 for allowing the tractor 1 to travel along the route, and controls the steering actuator 43 so as to make the steering wheel 12 turn with the calculated turning angle. The steering control device 52 is also capable of carrying out steering in accordance with the vehicle speed of the tractor 1, by communicating with each of the engine control device 15, the transmission control device 16, and the work equipment control device 17 through the vehicle bus line 18. Here, it may be acceptable that the steering actuator 43 adjusts a steering angle of the front wheels 7 of the tractor 1 instead of adjusting the turning angle of the steering wheel 12. In such a configuration, the steering wheel 12 does not rotate even when turn travel is performed.

The position measuring antenna 6 receives a signal from a positioning satellite included in the position measuring system such as a global navigation satellite system (GNSS). As shown in FIG. 1, the position measuring antenna 6 is disposed on a top face of a roof 14 of the cabin 11. A signal received by the position measuring antenna 6 is inputted to the position measuring and surveying device 53 shown in FIG. 3, so that the position measuring and surveying device 53 calculates position information on the tractor 1 (strictly, on the position measuring antenna 6). The position information is, for example, latitude/longitude information. The position information calculated by the position measuring and surveying device 53 is obtained by the autonomous travel control device 51, and then is used to control the tractor 1.

The position measuring and surveying device 53 is electrically connected to a first wireless communication antenna 48a included in the wireless communication antenna unit 48. The position measuring and surveying device 53 communicates with a reference station (portable type reference station) 60 which will be described later through a first wireless communication network (e.g., a wireless communication network with a 920 MHz band) using a specified low power radio wave. Referring to FIG. 1, the wireless communication antenna unit 48 is disposed on the top face of the roof 14 of the cabin 11. The position measuring and surveying device 53 communicates with the reference station 60 at a location near the field via the first wireless communication antenna 48a, and thereby corrects satellite position measuring information on the tractor 1 (mobile station) based on correction information received from the reference station 60, to obtain a current position of the tractor 1. Various position measuring systems such as a differential global positioning system (DGPS) and a realtime kinematic system (RTK) can be employed.

This embodiment employs RTK position measurement for example, and includes not only the tractor 1 serving as a mobile station having the position measuring antenna 6 but also the reference station 60 having a reference station position measuring antenna 61. The reference station 60 is disposed at a position (reference point) where the reference station 60 does not hinder the travel of the tractor 1. For example, the position (reference point) is at surroundings of the field. Position information on the reference point which is a position where the reference station 60 is installed is set in advance. The reference station 60 includes a reference station communication device 62 which is communicable with a communication device of the tractor 1 through the first wireless communication network constructed therebetween. The communication device of the tractor 1 is constituted by the position measuring and surveying device 53 and the first wireless communication antenna 48a.

In the RTK position measurement, the phase of a carrier wave from the positioning satellite 63 (satellite position measuring information) is measured both by the reference station 60 installed at the reference point and by the position measuring antenna 6 of the tractor 1 serving the mobile station for which position information is to be obtained. Each time satellite position measuring information from the positioning satellite 63 is measured or each time a preset period elapses, the reference station 60 generates correction information including the satellite position measuring information thus measured, position information on the reference point, and the like, so that the reference station communication device 62 sends the correction information to the first wireless communication antenna 48a of the tractor 1. The position measuring and surveying device 53 of the tractor 1 (corresponding to the mobile station) uses the correction information sent from the reference station 60, to correct satellite position measuring information measured by the position measuring antenna 6, thereby obtaining current position information (e.g., latitude information, longitude information) on the tractor 1.

Although this embodiment employs a high-accuracy GNSS using a global navigation satellite system real-time kinematic (GNSS-RTK), this is not limitative. Other position measuring systems may be employed as long as a position coordinate can be obtained with a high accuracy thereby. The GNSS-RTK is a position measuring method having an enhanced accuracy in which correction is performed based on information on a reference station whose position is known. There are a plurality of methods depending on how information is delivered from the reference station. A detailed description is omitted in this embodiment, because the present invention does not rely on the GNSS-RTK method.

The position measuring and surveying device 53 is also capable of measuring not only position information on the tractor 1 (machine body 2) based on the satellite position measurement but also tilt angle information on the front, rear, left, and right tilt angles based on inertial measurement. The tilt angle information measured by the position measuring and surveying device 53 is, while being associated with the position information (latitude/longitude information), acquired by the autonomous travel control device 51, and used to control the tractor 1. The position measuring and surveying device 53 is also capable of measuring a height position of the position measuring antenna 6 relative to a field plane, and therefore capable of measuring a vehicle height of the tractor 1 (machine body 2).

The wireless communication antenna unit 48, which is disposed on the top face of the roof 14 of the cabin 11 of the tractor 1, includes first to third wireless communication antennas 48a to 48c that are communicably connected with first to third wireless communication networks having different frequency bands. The first wireless communication network is constructed with, for example, a specified low-power wireless system with a 920 MHz band which provides a high data transfer speed, in order to allow communication of position measuring information measured by the reference station 60. The second wireless communication network is constructed with, for example, a low-power data communication system with 2.4 GHz band, in order to allow high-speed communication of heavy data such as image data. The third wireless communication network, which is used to transfer a smaller amount of data than the second wireless communication network does, is constructed with a specified low-power wireless system with a 400 MHz band, for example.

The first wireless communication antenna 48a is electrically connected to the position measuring and surveying device 53. The second wireless communication antenna 48b is electrically connected to the wireless communication router 54. The third wireless communication antenna 48c is electrically connected to the remote control receiver 55. The wireless communication router 54 connected to the second wireless communication antenna 48b communicates with a remote operation device 70 via the second wireless communication network. The remote operation device 70, which is capable of image display, is operated by an operator outside the tractor 1. The wireless communication router 54 receives a control signal from the remote operation device 70, and sends the control signal to the autonomous travel control device 51 through the autonomous travel bus line 56.

The remote control receiver 55 connected to the third wireless communication antenna 48c communicates with an emergency-stop remote controller 71 via the third wireless communication network. The emergency-stop remote controller 71 is operated by an operator outside the tractor 1. The remote control receiver 55 receives a control signal from the emergency-stop remote controller 71, and sends the control signal to the autonomous travel control device 51 through the autonomous travel bus line 56.

The remote operation device 70 is, to be specific, configured as a tablet-type personal computer including a touch panel. An operator can refer to and check information (e.g., field information required to perform autonomous travel) displayed on the touch panel of the remote operation device 70. The operator operates the remote operation device 70, to send a control signal for controlling the tractor 1 to the autonomous travel control device 51 of the tractor 1. The remote operation device 70 of this embodiment is not limited to a tablet-type personal computer, but may alternatively be configured as a laptop type personal computer, for example. In a case of a manned tractor (not shown) traveling in accompaniment with the unmanned tractor 1, a monitor device mounted in the manned tractor may be used as the remote operation device.

The autonomous travel control device 51 calculates a travel route in a field region (travel region) based on an instruction from the operator operating the remote operation device 70. The autonomous travel control device 51 compares the calculated travel route against position information on the tractor 1, to check a position of the tractor 1 on the travel route. Then, the autonomous travel control device 51 calculates a steering angle and a traveling speed of the tractor 1 in consideration of tilt angle information and the like. Then, the autonomous travel control device 51 communicates with each of the control devices 15, 16, 17, 52 through the vehicle bus line 18. In this manner, the tractor 1 can perform farm work with the work equipment 3 while autonomously traveling along the travel route. Such a route in the field region (travel region) along which the tractor 1 autonomously travels may hereinafter be referred to as a "travel route". In the field region (travel region), a region (work region) where farm work is to be performed with the work equipment 3 of the tractor 1 is a region obtained by excluding a headland and a margin from the entire field region. When the operator or the like performs an operation of registering registration points, the work region is set based on the registration points and a working width of the tractor 1.

The emergency-stop remote controller 71, which is a remote controller switch used to make an emergency stop the tractor 1, is carried by the operator operating the remote operation device 70. When the operator operates the switch, the emergency-stop remote controller 71 sends a control signal for emergency stop. The emergency-stop remote controller 71 has an emergency stop button 72 protruding from a surface of a remote controller body. Upon the operator pushing the emergency stop button 72, the control signal for emergency stop is sent. The emergency-stop remote controller 71 is configured to be attachable to and detachable from the remote operation device 70. The emergency-stop remote controller 71 is also configured such that a strap (string-like member) is attachable thereto so that the emergency-stop remote controller 71 can stick to an operator's body by, for example, suspending from his/her neck.

Based on an operator's operation on the emergency stop button 72 of the emergency-stop remote controller 71, the autonomous travel control device 51 communicates with the engine control device 15 to stop fuel injection from the common-rail device 41, and also communicates with the transmission control device 16 to bring the transmission 42 into a neutral state, and in this condition, performs a braking operation with later-described brake devices 26. At this time, the autonomous travel control device 51 may communicate with the steering control device 52 to control the steering actuator 43 so as to place the wheel 12 at a neutral position so that the left and right front wheels 7 are directed in a straight traveling direction.

The autonomous travel control device 51 checks, through the autonomous travel bus line 56, a communication state between the position measuring and surveying device 53 and the reference station 60 (a communication state in the first communication network), a communication state between the wireless communication router 54 and the remote operation device 70 (a communication state in the second communication network), and a communication state between the remote control receiver 55 and the emergency-stop remote controller 71 (a communication state in the third communication network). Upon determining that the communication state in any of the first to third communication networks is blocked, the autonomous travel control device 51 communicates with the engine control device 15, the transmission control device 16, and the like, to make an emergency stop of the autonomous travel of the tractor 1. Here, in cases where the position measuring and surveying device 53, the wireless communication router 54, and the remote control receiver 55 do not receive signals from their respective communication partners for a predetermined period or longer, it is determined that their communications with the respective communication partners are blocked.

The tractor 1 further includes a pair of left and right brake devices 26 which apply braking to the left and right rear wheels 8 based on two systems, namely, a system using operations on a brake pedal and on a parking brake lever and a system using an automatic control. Both of the left and right brake devices 26 are configured to apply braking to both of the left and right rear wheels 8 based on the brake pedal (or the parking brake lever) being operated in a braking direction. The brake devices 26 are also configured such that, if a turning angle of the wheel 12 reaches a predetermined angle or more, the brake device 26 corresponding to the rear wheel 8 located on the inner side of turning automatically performs a braking operation in accordance with a command from the transmission control device 16 (so-called autobrake).

An obstacle sensor 35 is attached to the tractor 1, the obstacle sensor 35 detecting whether or not an obstacle exists on a front, lateral, or rear side of the tractor 1. The obstacle sensor 35, which is constituted by a laser sensor, an ultrasonic sensor, or the like, is configured to recognize an obstacle existing on a front, lateral, or rear side of the tractor 1 and to generate a detection signal. A camera 36 is also attached to the tractor 1, the camera 36 photographing a front side, a lateral side, or a rear side of the tractor 1. The obstacle sensor 35 and the camera 36, which are capable of wireless communication with the wireless communication router 54, send an obstacle detection signal and an image signal to the autonomous travel control device 51 through the wireless communication router 54 and the autonomous travel bus line 56. The wireless communication router 54 sends the image signal from the camera 36 to the remote operation device 70 through the second wireless communication network, thereby allowing the remote operation device 70 to display an image of surroundings of the tractor 1. Here, it may be acceptable that the obstacle sensor 35 and the camera 36 are wire-connected to the autonomous travel control device 51 through the autonomous travel bus line 56.

The portable type reference station 60 includes a reference station wireless communication antenna 64 capable of wireless communication with the tractor (work vehicle) 1 which autonomously travels, the reference station position measuring antenna 61 which receives a signal from the positioning satellite 63, and the reference station communication device 62 which is electrically connected to each of the wireless communication antenna 64 and the position measuring antenna 61. The portable type reference station 60 is installed at a reference point that serves as a reference for identifying a position of the tractor (work vehicle) 1 serving as a mobile station. The portable type reference station 60 can be disassembled into a plurality of parts. The parts after disassembling have sizes transportable by the tractor 1.

In the portable type reference station 60 which is assembled from the disassembled parts and installed at the reference point, the reference station position measuring antenna 61 receives a signal from the positioning satellite 63, and the signal is sent to the reference station communication device 62. The reference station communication device 62 generates correction information including satellite position measuring information obtained by measurement, position information on the reference point, and the like. Then, the portable type reference station 60 sends the correction information generated by the reference station communication device 62, via the reference station wireless communication antenna 64 communicably connected to the first wireless communication network which is communicable with the first wireless communication antenna 48a of the tractor 1.

An embodiment of a wireless communication terminal device 88 will now be described with reference to FIG. 4 to FIG. 8. As shown in FIG. 8, the remote operation device (terminal device main body) 70 and the emergency-stop remote controller 71 which are capable of wireless communication with the tractor 1 are provided as the wireless communication terminal device 88 for operating an unmanned tractor 1 serving as an autonomous-travel work vehicle. The remote operation device 70 and the emergency-stop remote controller 71 communicate with the tractor 1 via different wireless communication networks having different communication schemes, respectively. The remote operation device 70 includes a display 74 capable of accepting a touch panel operation. The emergency-stop remote controller 71 is configured to be attachable to and detachable from an outer frame of the remote operation device 70. The emergency-stop remote controller 71 includes an emergency stop button 72 and a start button 73. The emergency stop button 72 is used to stop autonomous travel of the tractor 1. The start button 73 is used to start wireless communication with the tractor 1.

Figure 4:
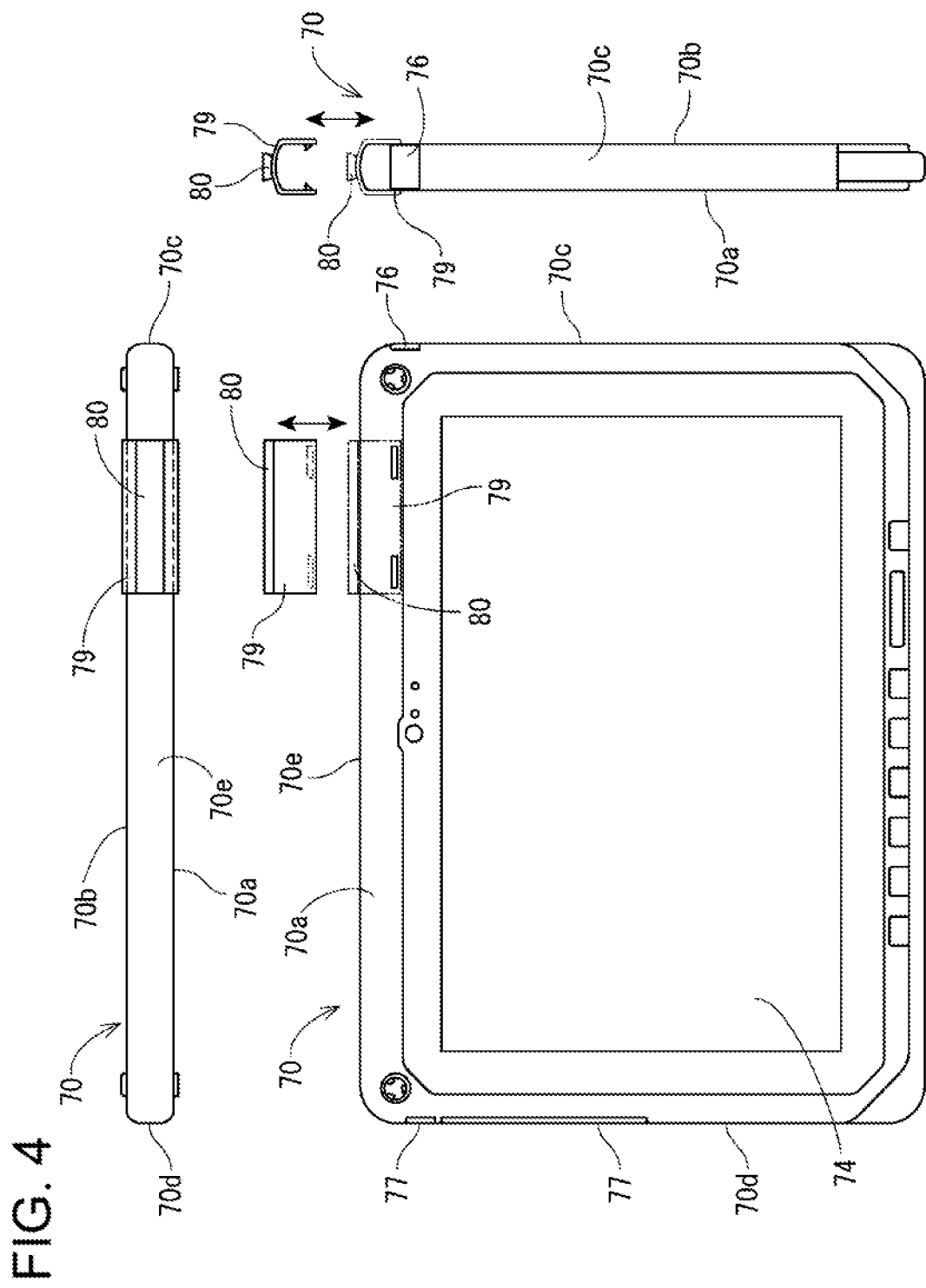
FIG. 4 Front, plan, and right side views of a remote operation device.
Figure 5:
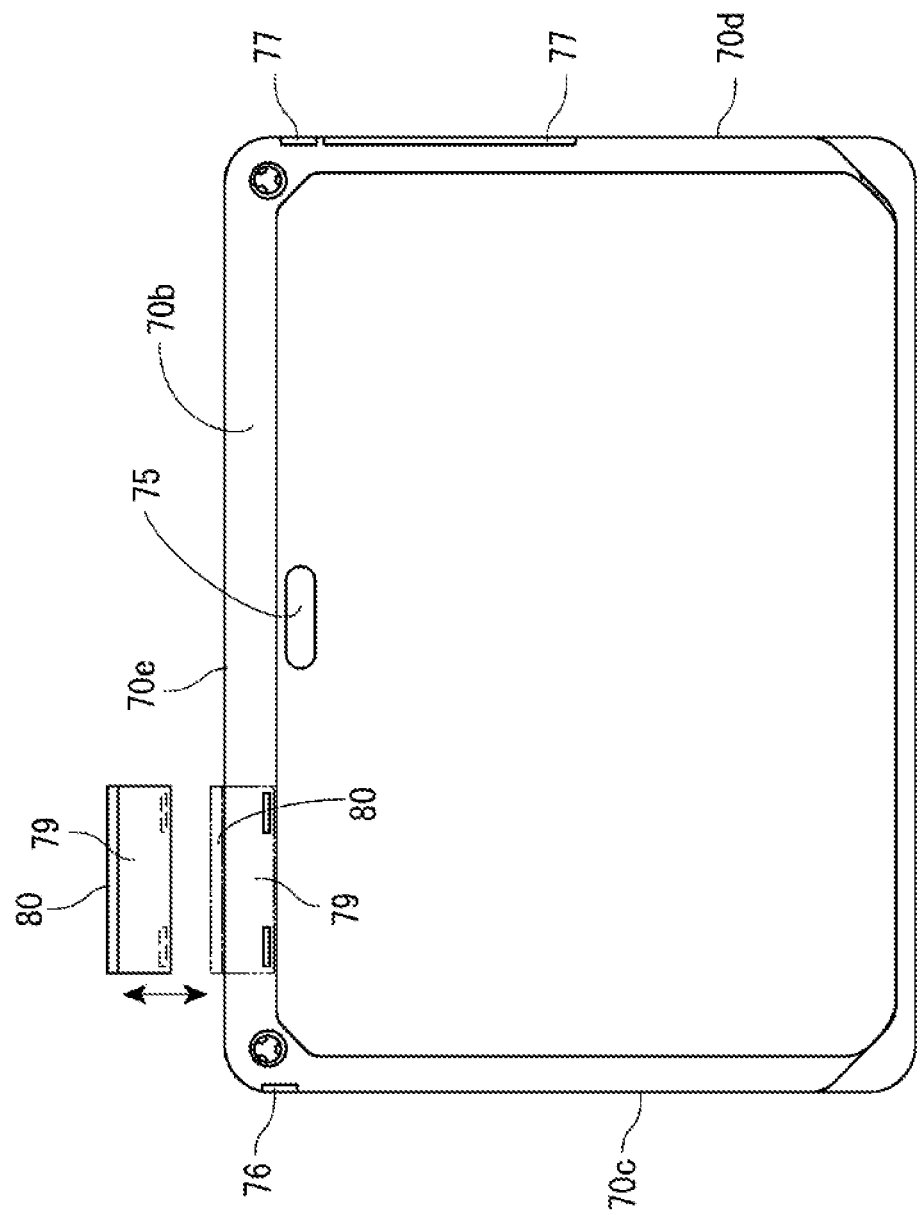
FIG. 5 A rear view of the remote operation device.

As shown in FIG. 4 and FIG. 5, the remote operation device 70 has a front surface 70a where the display 74 is disposed, a back surface 70b where a camera 75 is disposed, a right side surface 70c where a terminal covering 76 for covering a power source connection terminal is disposed, and a left side surface 70d where a terminal covering 77 for covering an external connection terminal that is connectable with a USB or the like is disposed. A remote controller mount 79 is attached in a detachable manner to an outer peripheral portion of an upper right portion of the remote operation device 70. The remote controller mount 79 is attached so as to extend from the front surface 70a to the back surface 70b across the upper surface 70e. The remote controller mount 79 has a substantially U-shaped cross-section. A tapered protrusion 80 whose width narrows toward its proximal side is disposed on an upper surface of the remote controller mount 79.

Figure 6:
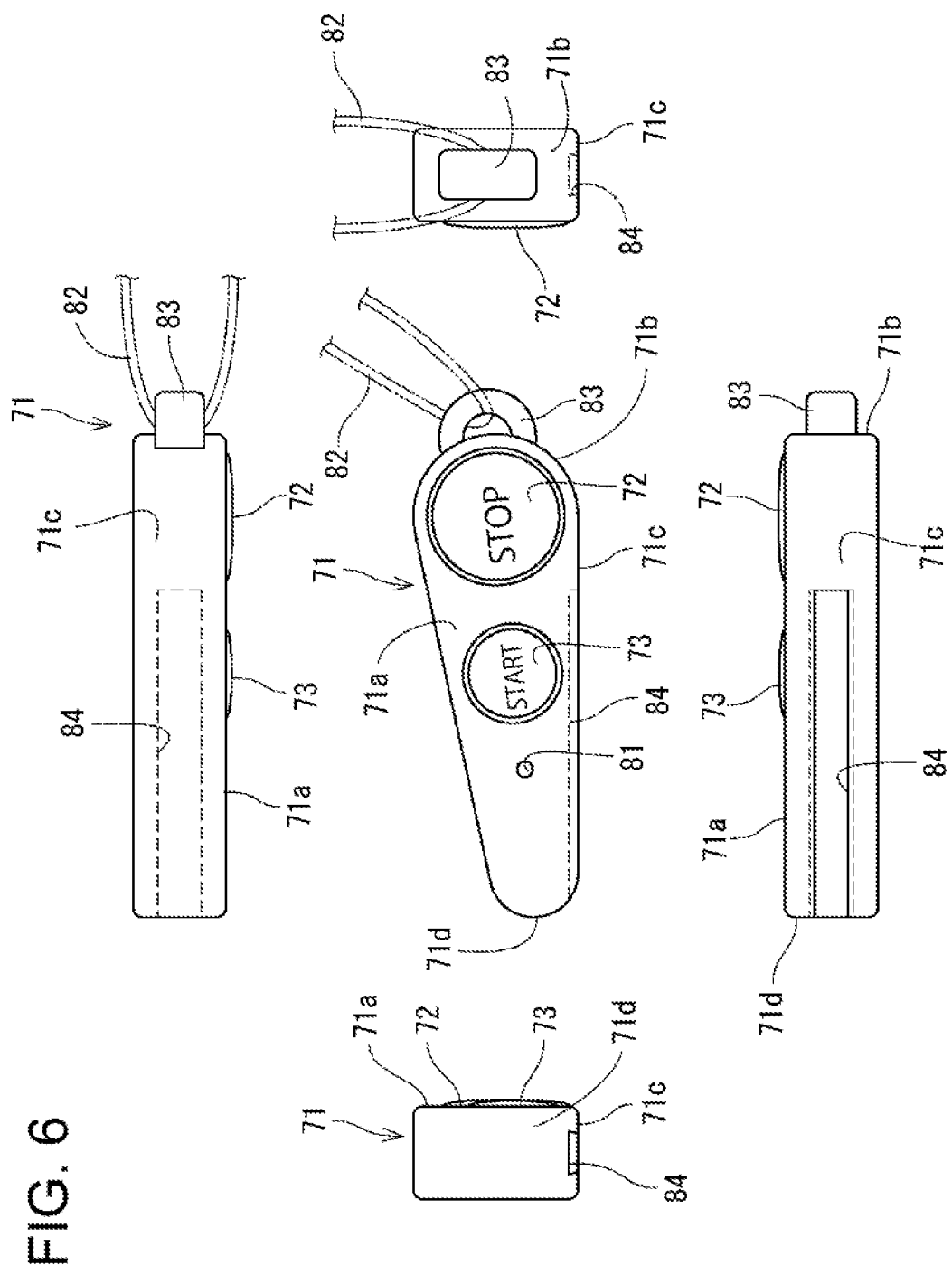
FIG. 6 Front, plan, bottom, left side, and right side views of an example of an emergency-stop remote controller.

As shown in FIG. 6, the emergency-stop remote controller 71 has a front surface 71a where the emergency stop button 72, the start button 73, and a lamp 81 are disposed. The front surface 71a has a contour defined by two circles, large and small, and two tangents. The lamp 81 constitutes a notification unit for providing notification about a state of the tractor 1. The emergency stop button 72 is arranged in an end portion of the front surface 71a on the larger-width side. The start button 73 is arranged in a middle portion of the front surface 71a. The lamp 81 is arranged in a portion of the front surface 71a relatively close to an end portion on the narrower-width side. The lamp 81 provides notification about a state of the tractor 1 by means of lighting off, lighting on, flashing, or changing color, for example. The emergency-stop remote controller 71 has a function for providing notification about a state of the tractor 1 by means of sounds. If an operator carries the emergency-stop remote controller 71 alone, the operator can recognize a state of the tractor 1 that is autonomously traveling based on notification provided by the lamp 81 and sounds even though the operator is somewhat distant from the tractor 1.

The emergency-stop remote controller 71 has, at its first end surface 71b on the larger-width side, a suspension member mount 83 to which a suspension member 82 such as a strap can be attached. The emergency-stop remote controller 71 has, at its first side surface 71c, an attachment groove 84 which is engageable with the protrusion 80 of the remote controller mount 79. The attachment groove 84 extends from a midway portion of the first side surface 71c to a second end surface 71d on the narrower-width side. The attachment groove 84 has a tapered shape that narrows toward the first side surface 71c, when viewed from the second end surface 71d side. An end portion of the attachment groove 84 on the second end surface 71d side is opened.

Figure 7:
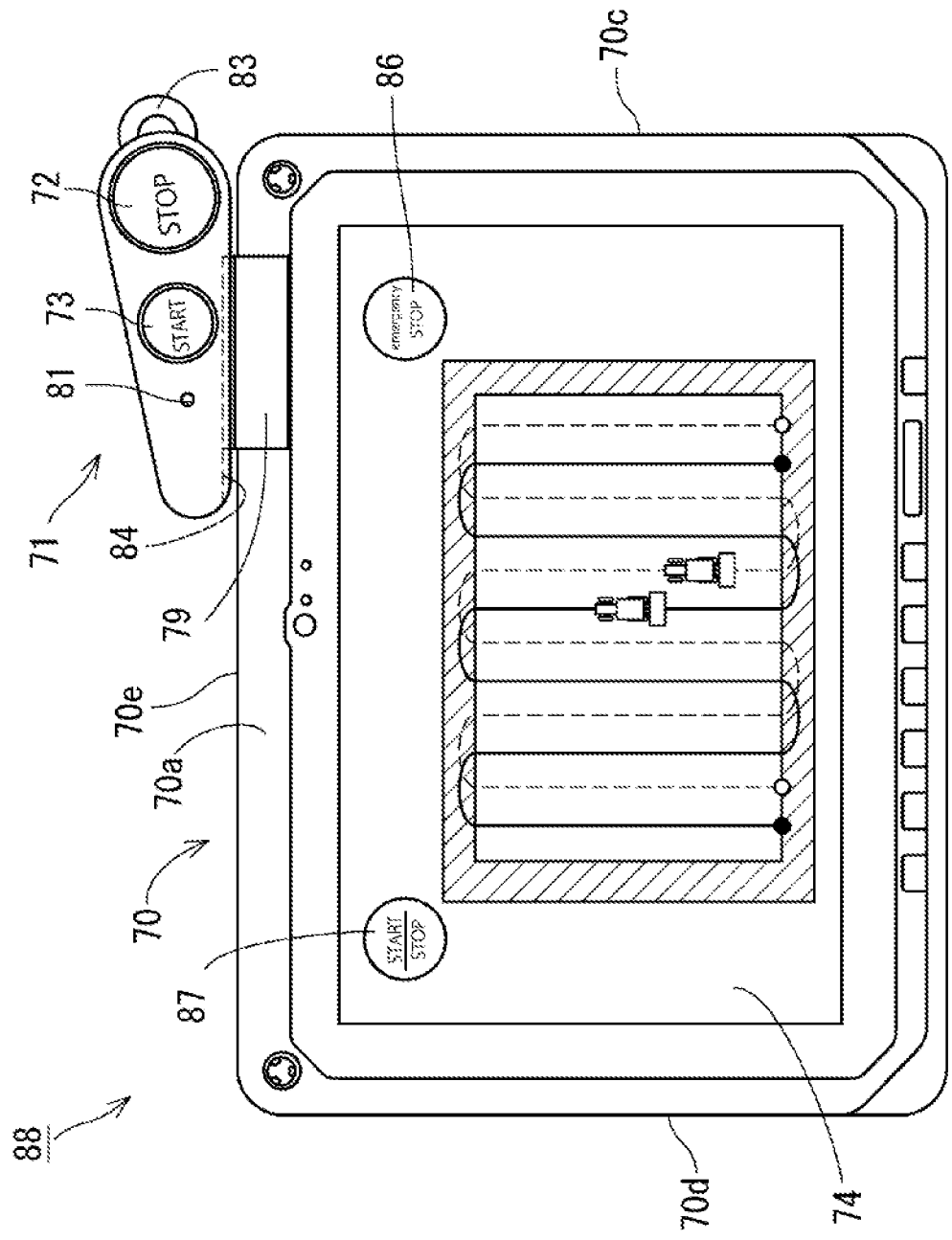
FIG. 7 A front view of an embodiment of a wireless communication terminal device.
Figure 8:
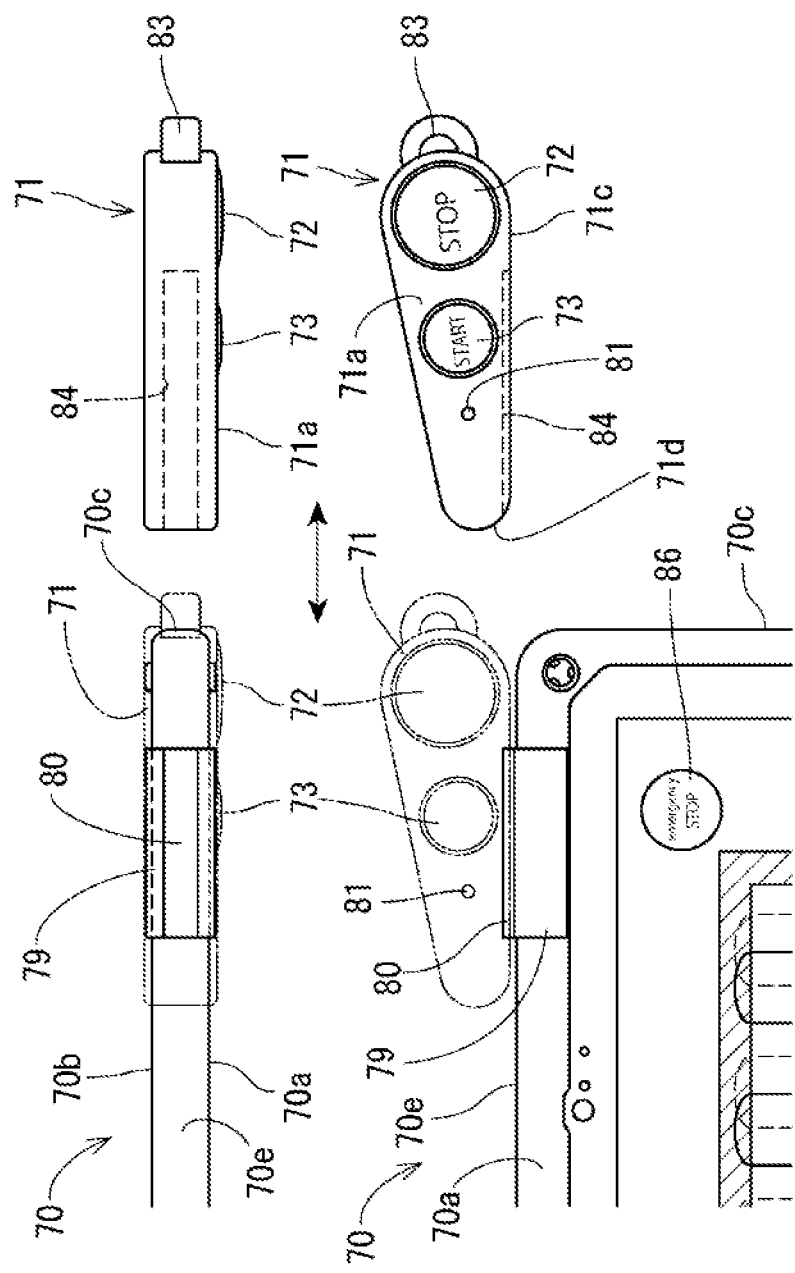
FIG. 8 Front and plan views of the emergency-stop remote controller, for explanation of attached and detached states thereof.

As shown in FIG. 7 and FIG. 8, the attachment groove 84 is engaged with the protrusion 80 of the remote controller mount 79 which is attached to the remote operation device 70, so that the emergency-stop remote controller 71 is attached to the remote operation device 70 in a detachable manner. The emergency-stop remote controller 71 is attached to the remote controller mount 79 such that the front surface 71a of the emergency-stop remote controller 71 faces in the same direction as the front surface 70a of the remote operation device 70 does.

The display 74 of the remote operation device 70 displays, in its upper right portion, an emergency stop button image 86 used to stop autonomous travel of the tractor 1. The display 74 also displays, in its upper left portion, a start/stop button image 87 used to start/stop autonomous travel of the tractor 1. Since the emergency stop button image 86 displayed on the display 74 is located near the position where the emergency-stop remote controller 71 is attached, the emergency stop button 72 and the emergency stop button image 86 can be arranged collectively, which makes it easy for an operator to recognize the positions of the emergency stop button 72 and the emergency stop button image 86 in a case where the operator is going to make an emergency stop of the tractor 1. Accordingly, a delay and an erroneous operation in the emergency stop operation can be reduced or minimized.

While the emergency-stop remote controller 71 is attached to the remote operation device 70, the start button 73 is at a position distant from the start/stop button image 87.

This, however, involves less risk of an erroneous operation and does not cause any particular problem, because starting wireless communication with the tractor 1 is not supposed to be performed under emergency.

To operate the emergency stop button image 86, the operator pushes (touches) the touch-panel type display 74, which gives the operator no feel of pushing and operating. On the other hand, the emergency stop button 72 has a structure that requires a firm push, which gives the operator a feel of pushing and operating. The operator can use either the emergency stop button 72 or the emergency stop button image 86 to make an emergency stop of the tractor 1.

The number of emergency-stop remote controllers 71 installed can be increased. In addition to an operator monitoring the tractor 1 that is autonomously traveling, a worker working in the same field can carry the emergency-stop remote controller 71. Thereby, the worker can recognize a state of the tractor 1 based on notification provided by the lamp 81 and sounds, and also can operate the emergency stop button 72 of the emergency-stop remote controller 71 in case of emergency. This can enhance a monitoring system on the tractor 1 that is autonomously traveling, and thus can provide an increased safety to the worker in the field.

Figure 9:
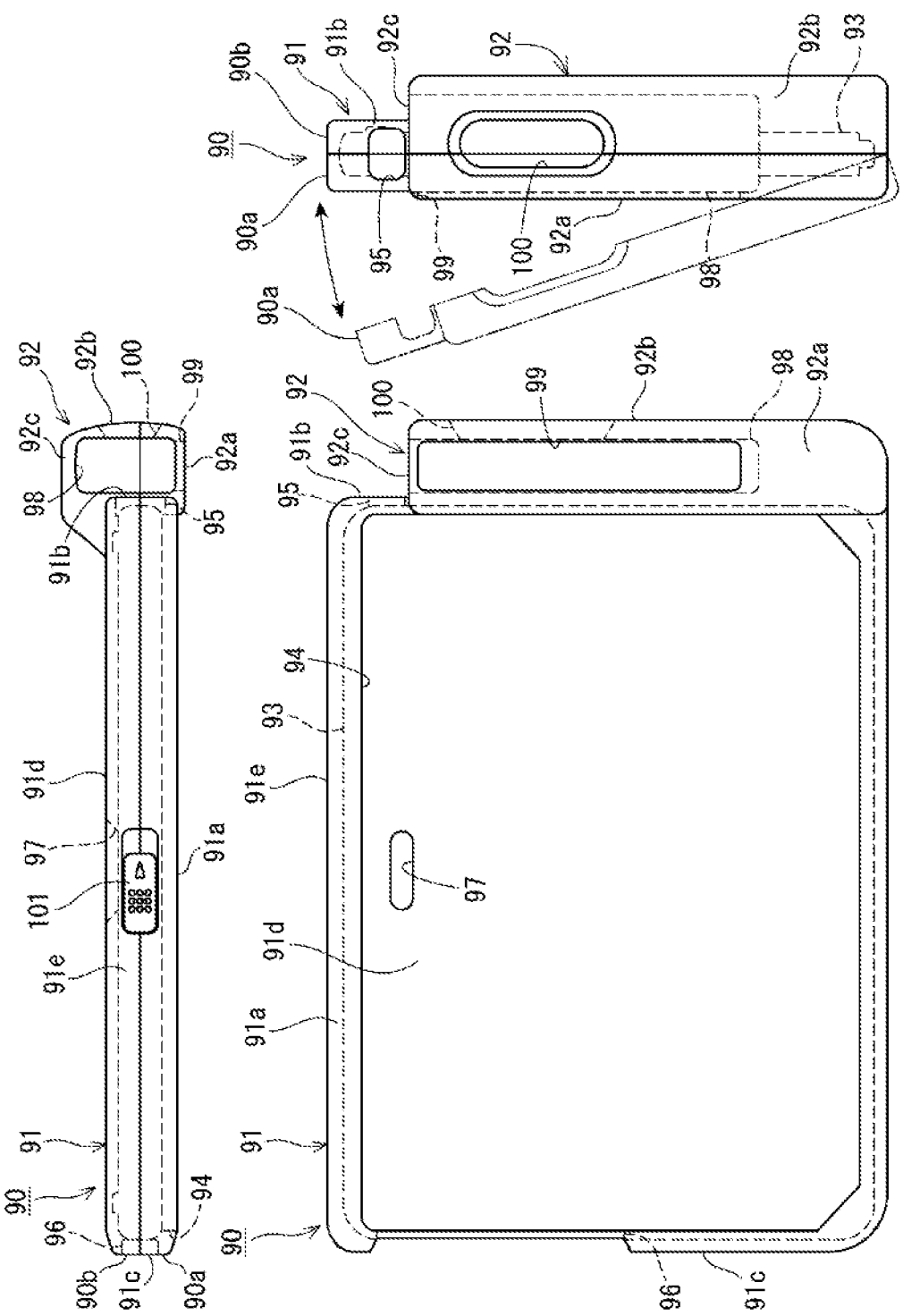
FIG. 9 Front, plan, and right side views of the wireless communication terminal device, illustrating an example of a covering thereof.

Another embodiment of the wireless communication terminal device 88 will now be described with reference to FIG. 9 to FIG. 12. The wireless communication terminal device 88 according to this embodiment includes a casing 90 which can accommodate the remote operation device 70 and which allows the emergency-stop remote controller 71 to be attached thereto and detached therefrom. As shown in FIG. 9, the casing 90 includes a main body casing part 91 for accommodating the remote operation device 70 and a remote controller casing part 92 for holding the emergency-stop remote controller 71. The main body casing part 91 includes, in its inside, a remote operation device accommodation part 93 for accommodating the remote operation device 70. The main body casing part 91 has: a front surface 91a where a display opening 94 is disposed at a position corresponding to the position of the display 74 of the remote operation device 70; a right side surface 91b where a power source connection opening 95 is disposed at a position corresponding to the position of the terminal covering 76 for covering the power source connection terminal; a left side surface 91c where an external device connection opening 96 is disposed at a position corresponding to the position of the terminal covering 77 for covering the external connection terminal; and a back surface 91d where a camera opening 97 is disposed at a position corresponding to the position of the camera 75. The main body casing part 91 holds an outer edge portion of the remote operation device 70 over the entire periphery thereof. Here, the casing 90 may not always need to have the camera opening 97.

The remote controller casing part 92 has a substantially rectangular parallelepiped shape elongated in a longitudinal direction. The remote controller casing part 92 is provided at and unified with a relatively lower right portion of the main body casing part 91. The remote controller casing part 92 protrudes toward the right lateral side and toward the back surface side. The remote controller casing part 92 includes a remote controller accommodation part 98 for accommodating the emergency-stop remote controller 71 in a detachable manner. The remote controller accommodation part 98 is constituted by a cavity portion that is slightly larger than the outer shape of the emergency-stop remote controller 71 having a substantially rectangular parallelepiped shape elongated in the longitudinal direction (see FIG. 10). The remote controller casing part 92 has an upper surface 92c with an opening that allows an access to the remote controller accommodation part 98. Through the opening, the emergency-stop remote controller 71 can be inserted into and extracted out of the remote controller accommodation part 98. The remote controller casing part 92 also has a front surface 92a where a button opening 99 is disposed, and a right side surface 92b where an extraction opening 100 is disposed. Through the button opening 99, buttons 72, 73 and a lamp 81 of the emergency-stop remote controller 71 are exposed. The extraction opening 100 is for allowing the emergency-stop remote controller 71 accommodated in the remote controller accommodation part 98 to be slid up and down with a finger.

As shown in FIG. 9, the casing 90 can be split into halves at its side surface portion. A casing front surface portion 90a and a casing back surface portion 90b, which are openable and closable by turning about their lower end side, are fixed by a lock mechanism 101 which is slidably provided on an upper surface 91e of the casing 90. With the casing front surface portion 90a and the casing back surface portion 90b being opened, the remote operation device 70 is accommodated in the remote operation device accommodation part 93, then the casing front surface portion 90a and the casing back surface portion 90b are closed, and then the lock mechanism 101 is fixed. In this manner, the remote operation device accommodation part 93 is securely held in the main body casing part 91.

Figure 10:
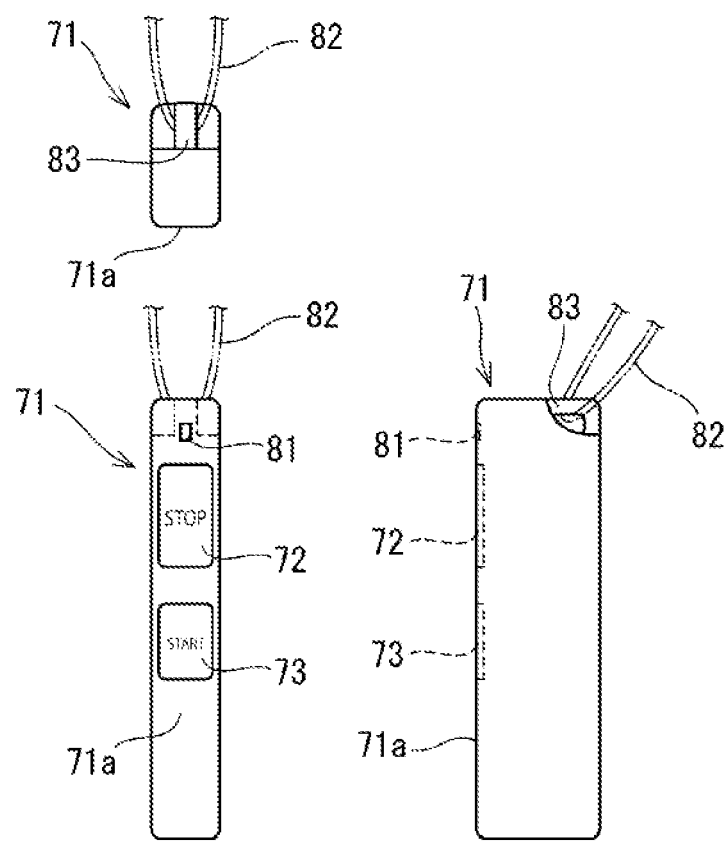
FIG. 10 Front, plan, and right side views of another example of the emergency-stop remote controller.

As shown in FIG. 10, the emergency-stop remote controller 71 has a substantially rectangular parallelepiped shape elongated in the longitudinal direction. The emergency-stop remote controller 71 has a front surface 71a where a notification lamp 81, an emergency stop button 72, and a start button 73 are arranged in this order from the upper end side. The emergency-stop remote controller 71 has, in an upper end portion on its back surface side, a suspension member mount 83 to which a suspension member 82 can be attached.

Figure 11:
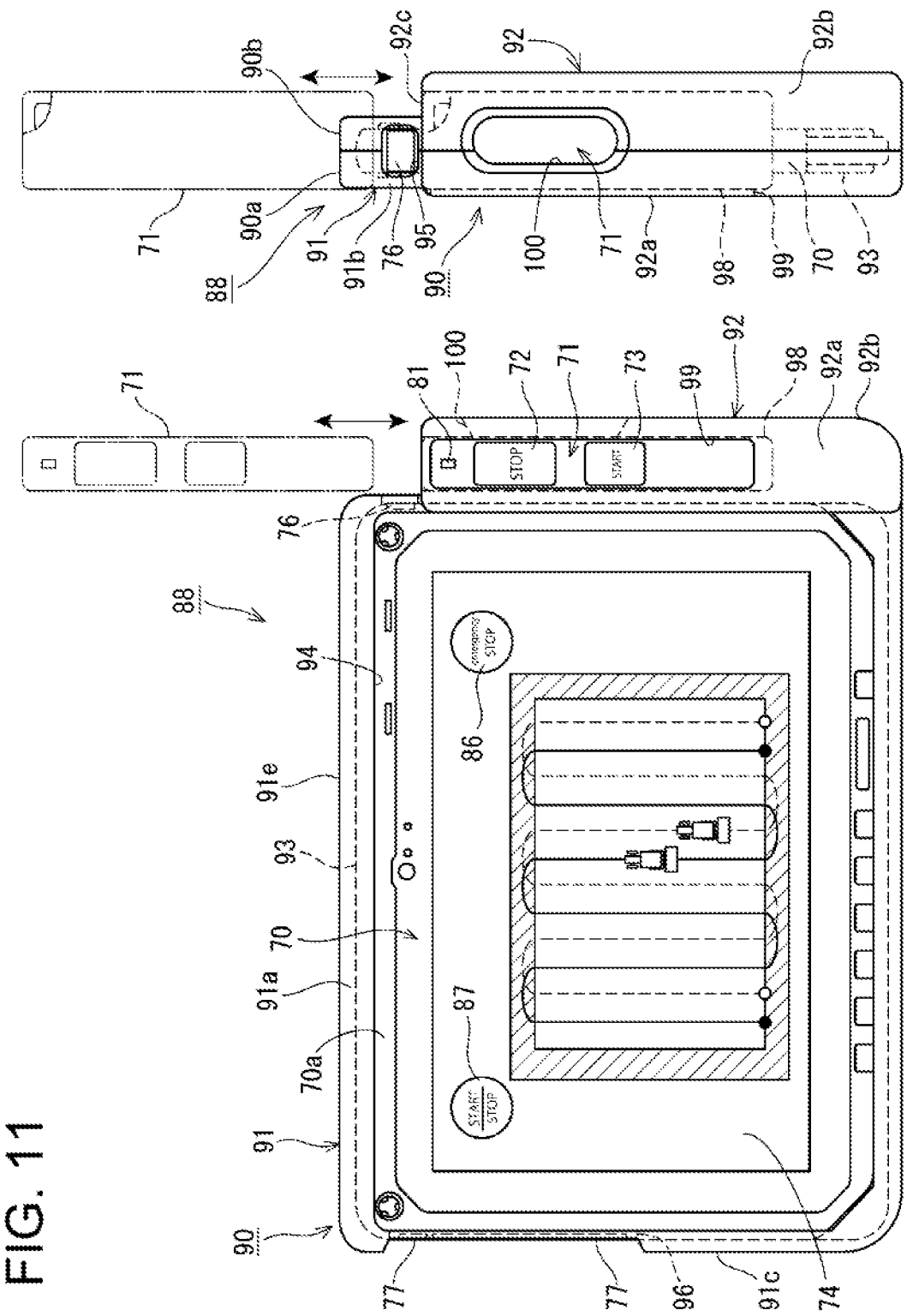
FIG. 11 Front and right side views of another embodiment of the wireless communication terminal device.
Figure 12:
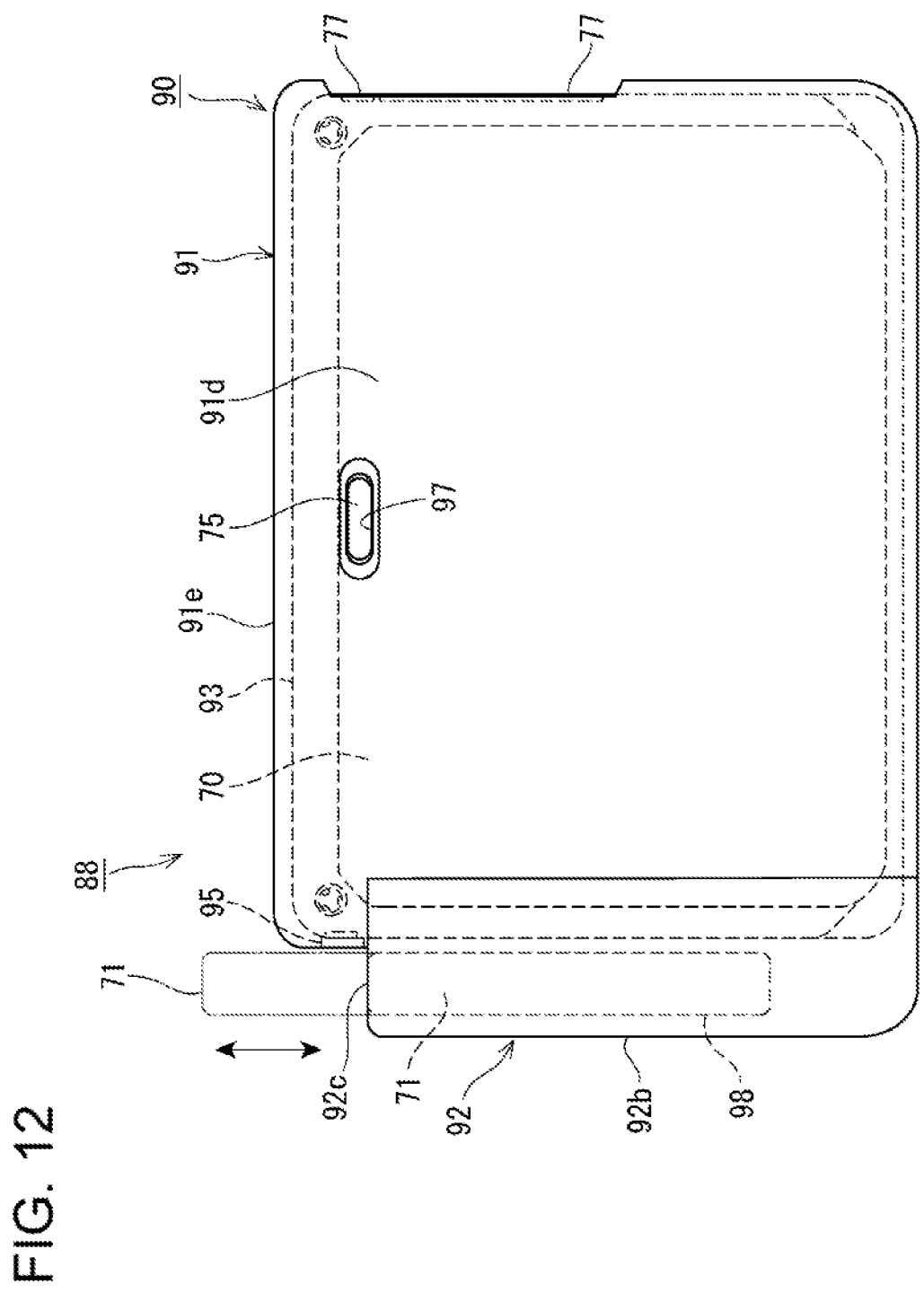
FIG. 12 A rear view of another embodiment mentioned above.

As shown in FIG. 11, the emergency-stop remote controller 71 is attached to the remote controller mount 79 such that the front surface 71a of the emergency-stop remote controller 71 faces in the same direction as the front surface 70a of the remote operation device 70 does. In this embodiment, like in the above-described embodiment, the display 74 of the remote operation device 70 displays an emergency stop button image 86 in its upper right portion, and also displays a start/stop button image 87 in its upper left portion, so that an operator can easily recognize the positions of the emergency stop button 72 and the emergency stop button image 86 in a case where the operator is going to make an emergency stop of the tractor 1.

The back surface of the remote controller casing part 92 protrudes farther than the back surface 91d of the main body casing part 91. That is, the remote controller casing part 92 has a shape that can be easily grasped by the operator. The operator grasps the remote controller casing part 92 with his/her right hand, and in this condition, can readily operate the buttons 72, 73 with his/her right thumb. Thus, the operator can start and stop wireless communication with the tractor 1 and can perform an emergency stop operation with the casing 90 being held in one (right hand) of his/her hands.

Figure 13:
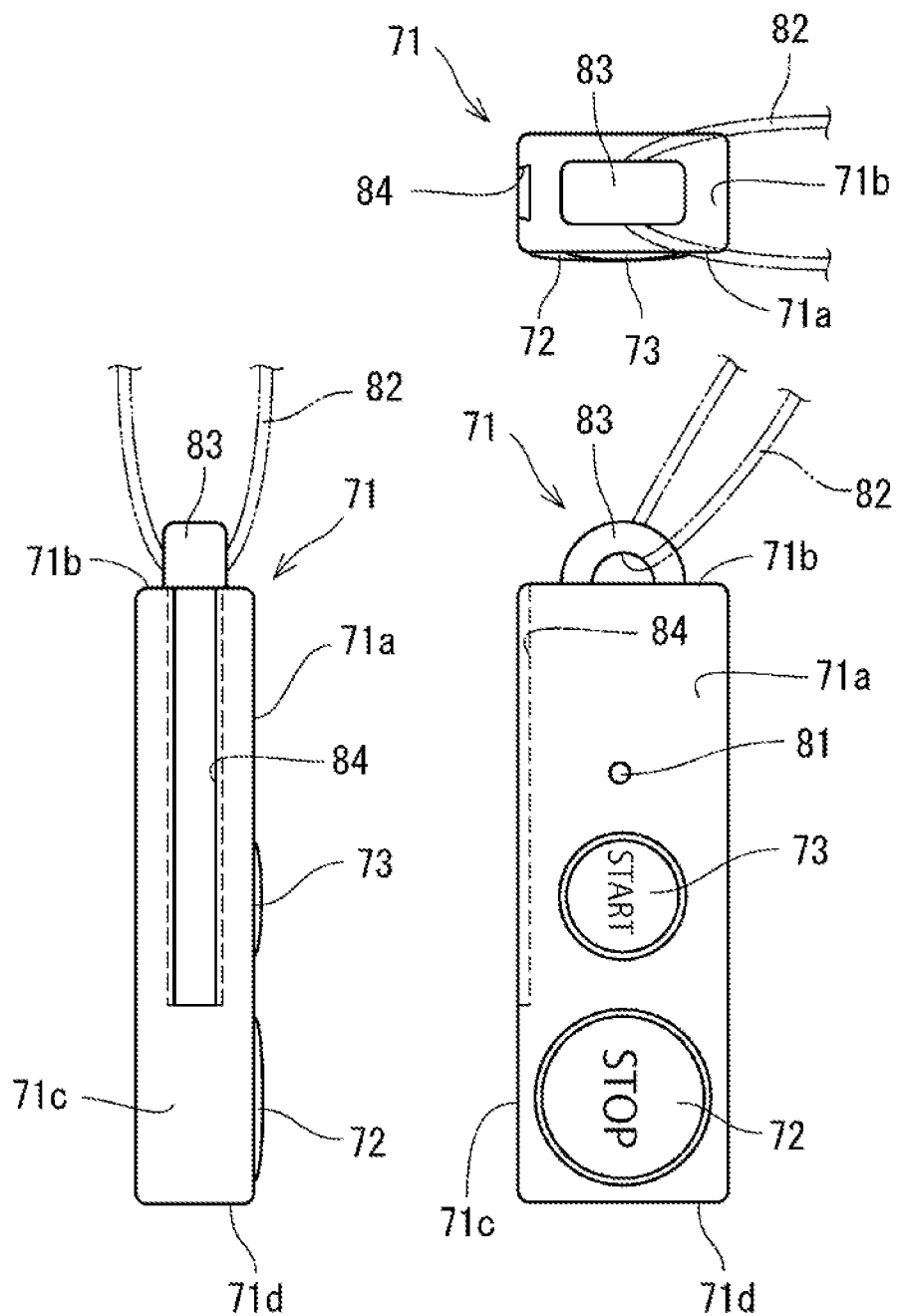
FIG. 13 Front, plan, and left side views of still another example of the emergency-stop remote controller.

Another embodiment of the wireless communication terminal device 88 will now be described with reference to FIG. 13 to FIG. 15. In the wireless communication terminal device 88 according to this embodiment, an emergency-stop remote controller 71 has a substantially rectangular parallelepiped shape elongated in a longitudinal direction, and has a front surface 71a where an emergency stop button 72, a start button 73, and a lamp 81 are disposed. The emergency-stop remote controller 71 has a first end surface 71*b* where a suspension member mount 83 to which a suspension member 82 can be attached is disposed, and a first side surface 71*c* where an attachment groove 84 engageable with a protrusion 80 of a remote controller mount 79 is disposed. The emergency stop button 72 is arranged in a portion near a second end surface 71*d* which is on the side opposite to the first end surface 71*b*. The start button 73 is arranged in a middle portion of the front surface 71*a*. The lamp 81 is arranged in a portion relatively closer to the first end surface 71*b* than the start button 73 is.

Figure 14:
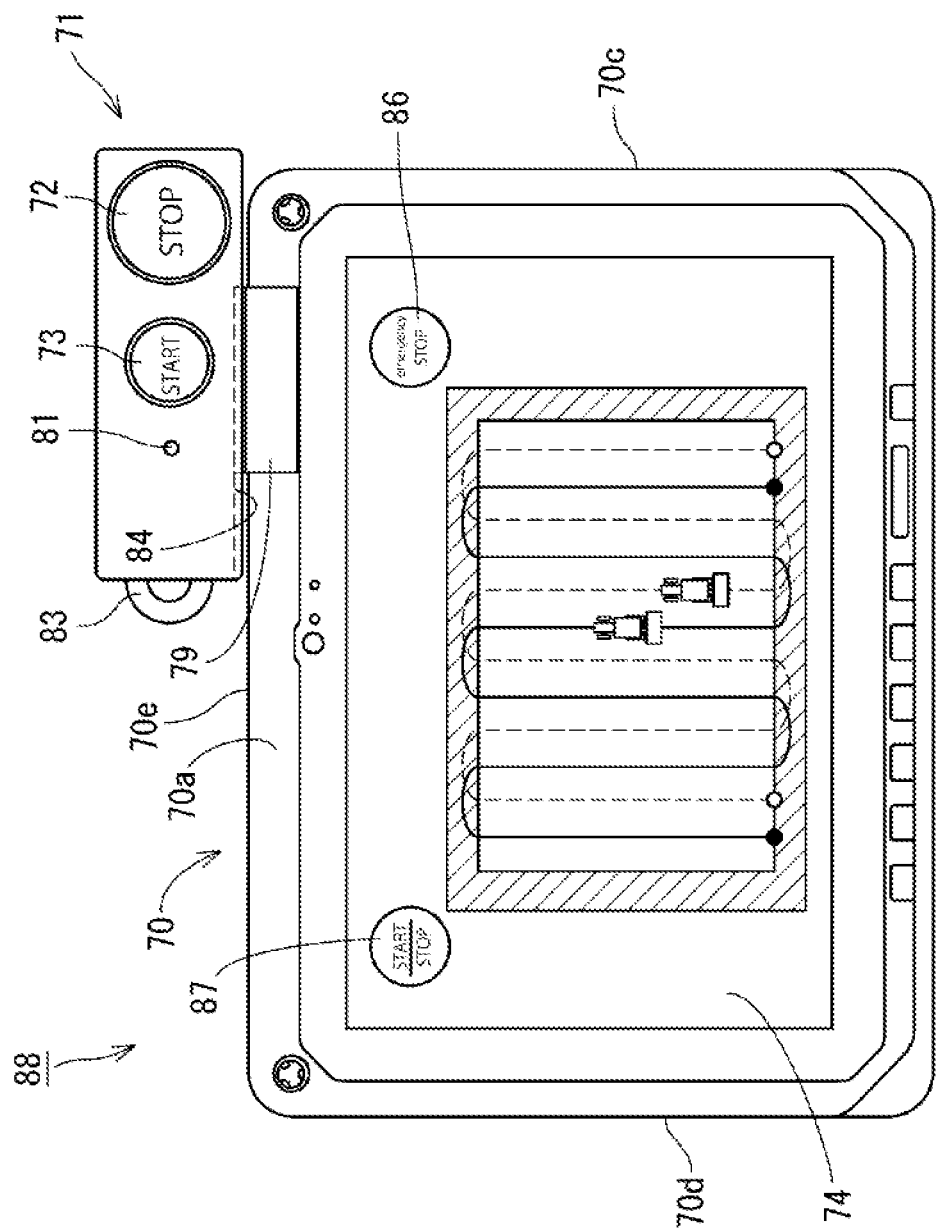
FIG. 14 A front view of still another embodiment of the wireless communication terminal device.
Figure 15:
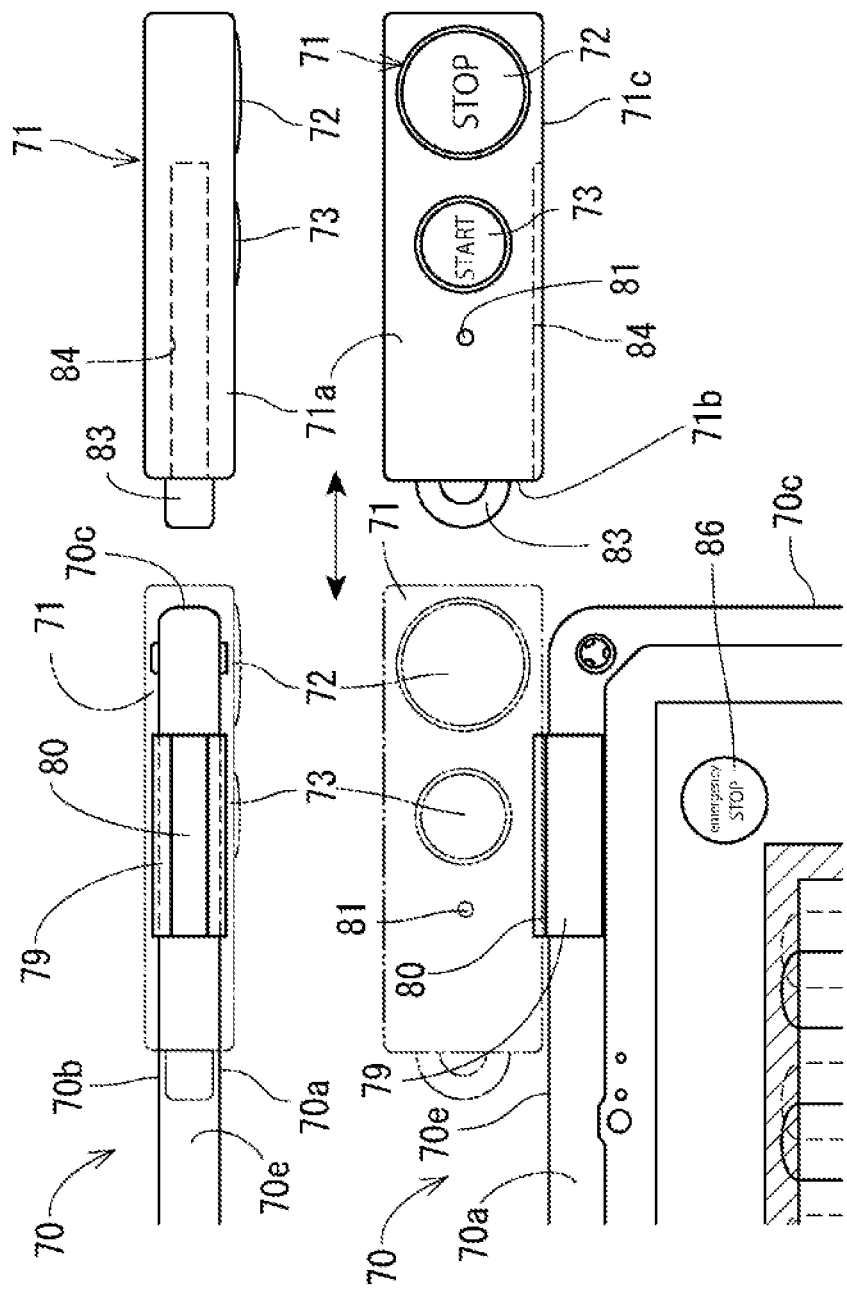
FIG. 15 Front and plan views of the emergency-stop remote controller, for explanation of attached and detached states thereof.

As shown in FIG. 14 and FIG. 15, the attachment groove 84 is engaged with the protrusion 80 of the remote controller mount 79 which is attached to the remote operation device 70, so that the emergency-stop remote controller 71 is attached to the remote operation device 70 in a detachable manner, like in the above-described embodiment referring to FIG. 4 to FIG. 8. An emergency stop button image 86 displayed on the display 74 is located near the position where the emergency-stop remote controller 71 is attached. This makes it easy for an operator to recognize the positions of the emergency stop button 72 and the emergency stop button image 86 in a case where the operator is going to make an emergency stop of the tractor 1.

In the emergency-stop remote controller 71 of this embodiment, the emergency stop button 72 is arranged at a position opposite to the suspension member 82. With this configuration, if the operator who is carrying the emergency-stop remote controller 71 with the suspension member 82 suspending from his/her neck picks up the emergency-stop remote controller 71, the emergency-stop remote controller 71 is in a front end portion (an end portion opposite to the suspension member mount 83) of the emergency-stop remote controller 71 held in his/her hand, when viewed from the operator. This enables the operator to easily recognize the position of the emergency-stop remote controller 71, and thus can reduce or minimize a delay and an erroneous operation in the emergency stop operation.

In the embodiment described above, the remote operation device (device main body) 70 and the emergency-stop remote controller 71 are provided as the wireless communication terminal device 88 for operating the tractor 1 serving as an autonomous-travel work vehicle, the remote operation device (device main body) 70 including the display 74 capable of accepting a touch panel operation, the emergency-stop remote controller 71 including the emergency stop button 72 used to stop autonomous travel of the tractor 1. Accordingly, by using the emergency-stop remote controller 71, the operator can quickly recognize the emergency stop button 72 and securely operate the emergency stop button 72, so that the emergency stop operation can be performed without delay in case of emergency.

The remote operation device 70 and the emergency-stop remote controller 71 perform wireless communication with the tractor 1 via different wireless communication networks having different communication schemes, respectively. Thus, the plurality of wireless communication networks function as a fail-safe system, which can provide an increased safety. In addition, communication schemes suitable for the remote operation device 70 and for the emergency-stop remote controller 71 can be selected in accordance with their respective communication data capacities.

Moreover, the emergency-stop remote controller 71 is attachable to and detachable from the outer peripheral portion of the remote operation device 70. Therefore, in a state where the position of the remote operation device 70 and the position of the emergency-stop remote controller 71 are fixed relative to each other, the operator can use whichever is easier to operate, the emergency stop button 72 or the emergency stop button image 86 which serve the same function. If the operator carries the emergency-stop remote controller 71 separately from the remote operation device 70, the operator is able to, for example, operate another device with both hands and, in case of emergency, operate the emergency stop button 72 of the emergency-stop remote controller 71 to perform an emergency stop operation on the autonomously traveling tractor 1 without delay. The operator who carries the remote operation device 70 can flexibly use the remote operation device 70 and the emergency-stop remote controller 71 depending on circumstances. For example, the operator may have the emergency-stop remote controller 71 in possession of another worker.

The emergency-stop remote controller 71 has the start button 73 used to start wireless communication with the tractor 1. On the display 74 of the remote operation device 70, the emergency stop button image 86 used to stop autonomous travel of the tractor 1 is displayed near the position where the emergency-stop remote controller 71 is attached, and the start/stop button image (start button image) 87 used to start wireless communication with the tractor 1 is displayed at a position more distant from the position where the emergency-stop remote controller 71 is attached than the emergency stop button image 86 is. Thus, the emergency stop button 72 and the emergency stop button image 86 can be arranged collectively, which makes it easy for the operator to recognize the positions of the emergency stop button 72 and the emergency stop button image 86 in a case where the operator is going to make an emergency stop of the tractor 1. Accordingly, a delay and an erroneous operation in the emergency stop operation can be reduced or minimized.

As shown in FIG. 9 to FIG. 12, the casing 90 is provided which includes the main body casing part 91 and the remote controller casing part 92 attached to the main body casing part 91. The main body casing part 91 holds the outer edge portion of the remote operation device 70 over the entire periphery thereof. The remote controller casing part 92 holds the emergency-stop remote controller 71 in a detachable manner. With this configuration, the remote operation device 70 can be held and protected securely, while the emergency-stop remote controller 71 can be easily attached or detached.

The emergency-stop remote controller has the lamp 81 and the sound output function which serve as the notification unit for providing notification about a state of the tractor 1. Accordingly, even the emergency-stop remote controller 71 alone enables the operator to recognize a state of the tractor 1 that is autonomously traveling based on notification provided by the lamp 81 and sounds even when the operator is somewhat distant from the tractor 1. Thus, the safety can be increased.

The present invention is not limited to the embodiments described above, but can be embodied into various aspects. The configurations of components in the present invention are not limited to those of the illustrated embodiments, and can be variously changed without departing from the gist of the present invention.

REFERENCE SIGNS LIST

1 robot tractor (work vehicle)
70 remote operation device (device main body)
71 emergency-stop remote controller
72 emergency stop button
73 start button (start button)

74 display
81 lamp (notification unit)
86 emergency stop button image
87 start/stop button image (start button image)
91 main body casing part
92 remote controller casing part
90 casing

The invention claimed is:

1. A remote control system for a work vehicle provided with a machine body and a work equipment mounted on the machine body, and for operating the work vehicle that causes the work equipment to perform work while the machine body autonomously travels, comprising:
 a remote control device for transmitting a control signal for controlling the machine body and the work equipment to the work vehicle by a first wireless communication method in response to a manual operation;
 a stop remote controller for transmitting a stop signal for stopping the autonomous traveling of the machine body to the work vehicle by a second wireless communication method different from the first wireless communication method in response to a manual operation,
 wherein the stop remote controller is configured to be able to accept only the operation related to the stop of the autonomous traveling of the machine body among controls of the work vehicle.

2. The remote control system according to claim 1, wherein the first wireless communication method has a higher transmission speed than the second wireless communication method.

3. The remote control system according to claim 1, wherein the work vehicle can communicate with a plurality of the stop remote controllers by the second wireless communication method.

4. The remote control system according to claim 1, wherein a stop button image is displayed on a display unit of the remote control device, and the autonomous traveling of the machine body is stopped regardless of which of the stop remote controller or the stop button image is operated.

5. The remote control system according to claim 1, wherein an image of surroundings of the work vehicle captured by an obstacle sensor and a camera mounted on the work vehicle is displayed on a display unit of the remote control device.

6. An autonomous traveling operation system, comprising: the remote control system according to claim 1; and the work vehicle.

7. A remote control system for a work vehicle that includes a machine body and a work equipment attached to the machine body, and causes the work equipment to perform work while causing the machine body to autonomously travel, the system comprising:
 a remote control device that transmits a control instruction signal for controlling the machine body and the work equipment to the work vehicle using a first wireless communication method in response to a manual operation; and
 a stop remote controller that transmits a stop instruction signal for stopping the autonomous travelling of the machine body to the work vehicle using a second wireless communication method different from the first wireless communication method in response to a manual operation,
 wherein the stop remote controller is configured to be able to receive an operation to start wireless communication with the work vehicle and an operation to stop autonomous travel of the machine body.

* * * * *